United States Patent Office 3,306,880
Patented Feb. 28, 1967

3,306,880
1-CYANOVINYL ALKYL CARBONATES, PROCESS FOR THEIR PRODUCTION AND POLYMERS THEREOF
Lieng-Huang Lee, Midland, Mich., assignor to The Dow Chemical Company, Midland, Mich., a corporation of Delaware
No Drawing. Filed Feb. 14, 1964, Ser. No. 344,819
14 Claims. (Cl. 260—77.5)

This invention relates to new compositions of matter and to methods of making same. More particularly, this invention relates to 1-cyanovinyl alkyl carbonates, methods for making 1-cyanovinyl alkyl carbonates and to polymers of 1-cyanovinyl alkyl carbonates.

The present invention provides new and useful compounds having the general formula

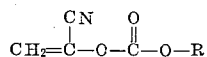

in which R is an alkyl group having from one to twenty carbon atoms. The term "alkyl" includes cycloalkyl and aralkyl. Representative illustrative examples of suitable alkyl groups are methyl, ethyl, propyl, isopropyl, butyl, isobutyl, tertiary butyl, pentyl, hexyl, cyclohexyl, benzyl, octyl, dodecyl and stearyl.

Specific examples of 1-cyanovinyl alkyl carbonates of this invention are: 1-cyanovinyl methyl carbonate, 1-cyanovinyl ethyl carbonate, 1-cyanovinyl isopropyl carbonate, 1-cyanovinyl butyl carbonate, 1-cyanovinyl octyl carbonate, and 1-cyanovinyl stearyl carbonate.

These compounds can be made according to the present invention by reacting an alkyl haloformate with 2-chloro-lactonitrile to form the 2-chloro-1-cyanoethyl alkyl carbonate which is then dehydrohalogenated to form the 1-cyanovinyl alkyl carbonate as indicated in the following equations:

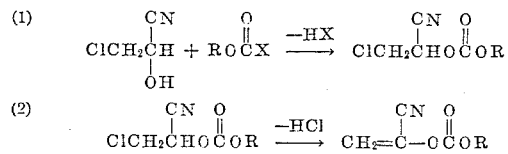

in which R is one of the alkyl radicals above mentioned and X is a halogen selected from the group consisting of chlorine, bromine and iodine. The alkyl haloformate is conveniently an alkyl chloroformate. Typical examples of such alkyl chloroformates are methyl chloroformate, ethyl chloroformate, isopropyl chloroformate, butyl chloroformate, octyl chloroformate, and so forth. The 2-chloro-lactonitrile used in the reaction is the cyanohydrin of chloroacetaldehyde and is prepared by reacting hydrogen cyanide with chloroacetaldehyde by methods known to the art.

The reaction of the 2-chloro-lactonitrile with the alkyl haloformate according to Equation 1 above, is carried out by adding substantially equal molar ratios of the reactants in the presence of an alkaline reagent such as pyridine, quinoline, dimethylaniline or other cyclic tertiary amines.

The reaction is preferably carried out below normal room temperatures, i.e. at a temperature of 15° C. or lower, beneficially at a temperature between —5° C. and 5° C., for example, 0° C.

Suitable solvents such as benzene, methylene chloride, chloroform, toluene, carbon tetrachloride, xylene and petroleum ether may be present to dissolve the reactants and permit a liquid phase reaction. The solvent may be removed after the reaction by any suitable means such as distillation.

The dehydrohalogenation of the 2-chloro-1-cyanoethyl alkyl carbonate to produce the 1-cyanovinyl alkyl carbonates of the present invention, represented in Equation 2 above, is accomplished by adding substantially equal molar amounts of an aliphatic or aromatic tertitary amine such as triethylamine, tributylamine, pyridine, quinoline, tricyclohexylamine, and the like, to the 2-chloro-1-cyanoethyl alkyl carbonate at a temperature of about 0° to 50° C., 20 to 30° C. being preferred, in a suitable solvent. The amine reactant is precipitated as the chloride salt and the 1-cyanovinyl alkyl carbonate is recovered by distillation.

The 1-cyanovinyl alkyl carbonates are relatively stable against hydrolysis but will disclolor upon exposure to air. In order to keep the 1-cyanovinyl alkyl carbonate product in a favorable state it is desirable to add to the reaction medium a phenolic stabilizer such as tert-butyl catechol before separation or distillation of the final product.

The compounds of this invention are effective and useful anthelmintics. In addition, the 1-cyanovinyl alkyl carbonates can be polymerized to form polymers which can be molded into useful articles such as blocks, sheets, films and the like by conventional techniques. The polymer can be a homopolymer of a 1-cyanovinyl alkyl carbonate, or a coplymer of a mixture of two or more 1-cyanovinyl alkyl carbonates, or a copolymer of a mixture of one or more 1-cyanovinyl alkyl carbonates with one or more ethylenically unsaturated compounds copolymerizable therewith. Typical monomers copolymerizable with 1-cyanovinyl alkyl carbonates are styrene and monomers copolymerizable with styrene. Representative illustrative examples of such ethylenically unsaturated monomers are the vinyl esters such as vinyl acetate, vinyl butyrate and the like; vinylidene compounds such as vinylidene chloride and the like; acrylic and methacrylic acids; acrylates and methacrylates such as ethyl acrylate and methyl methacrylate; acrylonitrile, styrene and substituted styrenes; acrylamides such as N-isopropyl acrylamide and the like; fumaramides; fumarates; citraconamides; citraconamates; maleamates; maleamides, ethylene, propylene, 1-butene and similar well-known monoethylenically unsaturated copolymerizable materials.

The examples which follow are illustrative of the present invention but the invention is not limited to the details thereof.

*Example 1*

A solution of 66 grams (0.61 mole) of ethyl chloroformate dissolved in 100 milliliters of methylene chloride was added to a three-necked, 500 milliliter flask equipped with stirrer, thermowell and condenser along with 60 grams (0.57 mole) of 2-chloro-lactonitrile. The flask was cooled with solid carbon dioxide in a methylene chloride bath to maintain the temperature between 0° and 5° C. Fifty grams (0.63 mole) of pyridine was gradually added to the solution over a period of two hours. The reaction mixture was then stirred an additional 3 hours after which time the solution was filtered to remove pyridine hydrochloride salt and distilled. The product, 2-chloro-1-cyanoethyl ethyl carbonate, a colorless liquid, was obtained in 68 percent yield (68 grams) and had the following properties:

Boiling point (at 0.3 mm. mercury)=103–106° C.
$d_4^{25}=1.3931$
$N_D^{25}=1.4374$ Elemental analysis confirmed the presence of the 2-chloro-1-cyanoethyl ethyl carbonate. The elemental analysis was as follows:

Calculated: C, 40.45; H, 4.49; Cl, 20.20. Found: C, 40.81; H, 4.71; Cl, 19.57.

A portion of the 2-chloro-1-cyanoethyl ethyl carbonate (10 grams, 0.056 mole) prepared above was dissolved in 50 milliliters of methylene chloride. Six grams (0.06 mole) of triethylamine was added slowly to the solution along with 0.2 gram of tert-butyl catechol while the temperature was maintained between 22° and 25° C. A white precipitate of the amine salt started to form and precipitated within 5 minutes after addition of the amine. The solution was distilled and the final product, 1-cyanovinyl ethyl carbonate, was water white and had a boiling point of 56°–58° C. at a pressure of 0.3 milliliter of mercury.

The dehydrohalogenation step (i.e. the reaction of 2-chloro-1-cyanoethyl ethyl carbonate with triethylamine) can be carried out in the absence of tert-butyl catechol or other phenolic stabilizers, but the resulting 1-cyanovinyl ethyl carbonate product usually has a dark color.

In a manner similar to the foregoing example, any of the alkyl haloformates indicated above can be reacted with 2-chloro-lactonitrile referred to herein to produce 1-cyanovinyl alkyl carbonates of the class described. The products have similar properties and utilities; for example, they can be polymerized as indicated below.

*Example 2*

Four grams of 1-cyanovinyl ethyl carbonate was placed in a glass polymerization tube with 0.02 gram of benzoyl peroxide as a catalyst. The tube was sealed under nitrogen. Polymerization took place at 80° to 82° C. for 6 hours. The viscous product was devolatilized and a solid, moldable resin was recovered.

*Example 3*

Into a glass polymerization tube was placed four grams of 1-cyanovinyl ethyl carbonate, four grams of styrene along with 0.02 gram of benzoyl peroxide. The tube was then sealed in an atmosphere of nitrogen. The tube and its contents were maintained at a temperature of 62–63° C. for two days. A viscous product resulted from which the volatile material was then removed leaving eight grams of a solid transparent resin which was moldable into film by conventional techniques.

In a manner similar to Examples 2 and 3, the other 1-cyanovinyl alkyl carbonates of this invention can be polymerized alone or in admixture with other ethylenically unsaturated monomers as hereinabove indicated in the presence of a polymerization-favoring catalyst such as a per catalyst as the peroxide employed in the examples or one of the persulfates, for example, potassium persulfate and the like, to produce solid resins which can be molded into useful shaped articles.

*Example 4*

1-cyanovinyl ethyl carbonate is useful as an anthelmintic adapted to be employed for the control of such undesirable parasitic organisms as mouse tapeworms.

In a representative operation the feeding in unrestricted quantity of a balanced commercial laboratory diet modified by the inclusion therein of 1-cyanovinyl ethyl carbonate in the concentration of 0.06 percent by weight over a period of 7 days to mice parasitized by mouse tapeworm gave a 100 percent kill of the tapeworms without evident injury to the mice.

What is claimed is:

1. A compound having the general formula

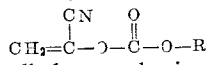

in which R is an alkyl group having from 1 to 20 carbon atoms.

2. The compound: 1-cyanovinyl ethyl carbonate.

3. A process for the production of a 1-cyanovinyl alkyl carbonate which comprises the steps of (1) reacting an alkyl haloformate, said alkyl group containing 1 to 20 carbon atoms, with 2-chlorolactonitrile in the presence of an alkaline compound to form the 2-chloro-1-cyanoethyl alkyl carbonate and then (2) reacting the 2-chloro-1-cyanoethyl alkyl carbonate with a tertiary amine to dehydrohalogenate said chloro-cyanoethyl alkyl carbonate and form the 1-cyanovinyl alkyl carbonate.

4. The process of claim 3 wherein the alkaline compound is a cyclic tertiary amine.

5. The process of claim 3 wherein the alkaline compound is pyridine.

6. The process of claim 3 wherein the tertiary amine is triethylamine.

7. The process of claim 3 wherein the alkyl haloformate is reacted with 2-chloro-lactonitrile at a temperature from about −10° to about 15° C.

8. The process of claim 3 wherein the 2-chloro-1-cyanoethyl alkyl carbonate is reacted with a tertiary amine at a temperature from about 0° C. to about 50° C.

9. The process of claim 3 wherein the alkyl haloformate is ethyl chloroformate.

10. A polymer of a monomeric material having the general formula

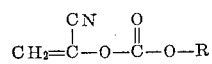

in which R is an alkyl group having from 1 to 20 carbon atoms.

11. A polymer of a monomeric material having the formula

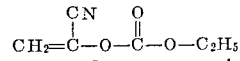

12. A homopolymer of a monomeric material having the general formula

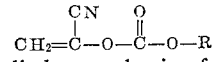

in which R is an alkyl group having from 1 to 20 carbon atoms.

13. A copolymer of a monoethylenically unsaturated polymerizable monomer and a monomeric material having the general formula

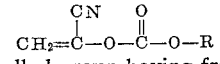

in which R is an alkyl group having from 1 to 20 carbon atoms.

14. The copolymer of 13 wherein the monoethylenically unsaturated polymerizable monomer is styrene.

References Cited by the Examiner

UNITED STATES PATENTS 2,682,527  6/1954  Dickey et al. _____ 260—77.5

SAMUEL H. BLECH, *Primary Examiner.*